March 19, 1968

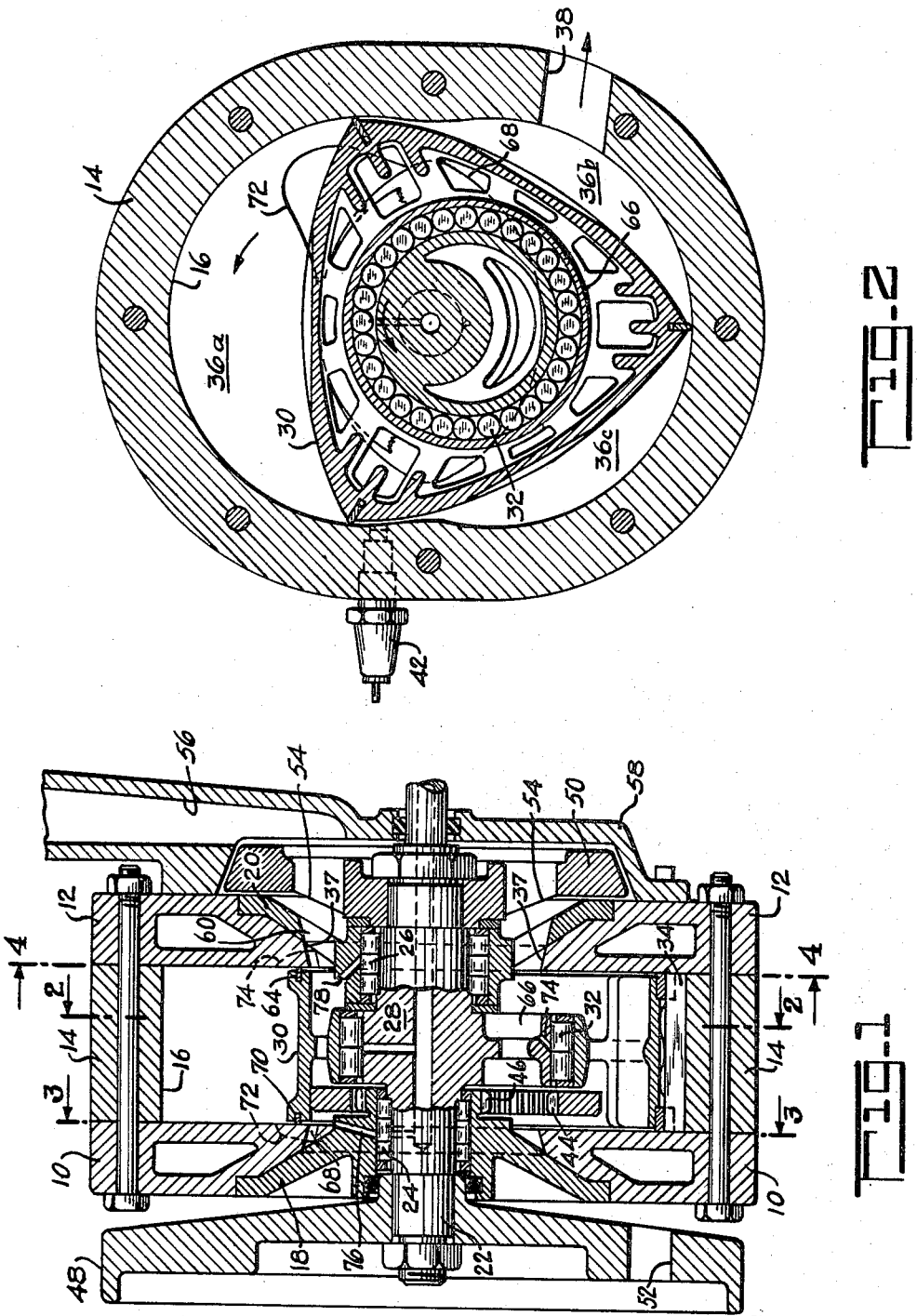

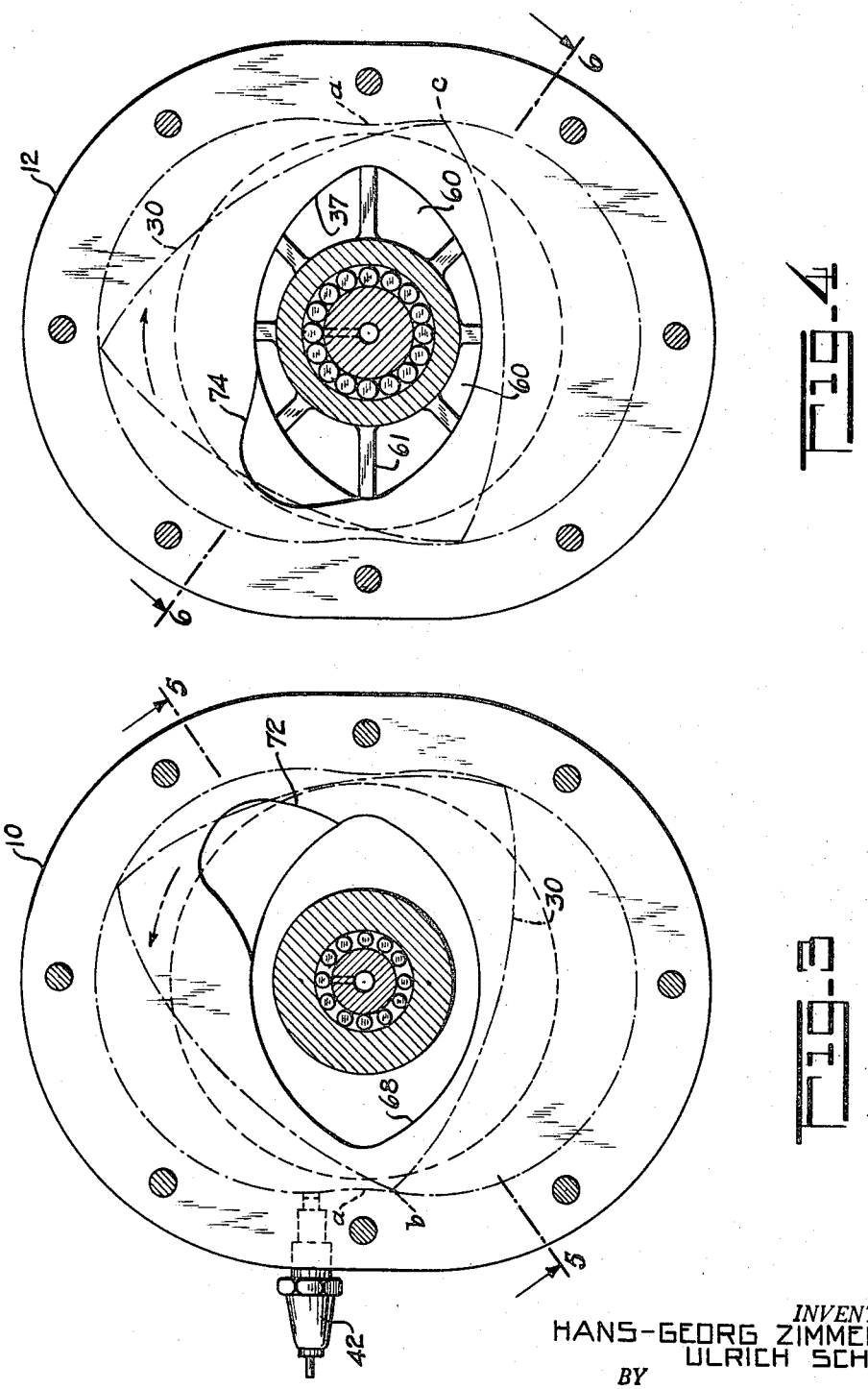

HANS-GEORG ZIMMERMANN ET AL 3,373,722
COOLING SYSTEM FOR THE ROTOR OF A ROTARY
INTERNAL COMBUSTION ENGINE

Filed Aug. 29, 1966 3 Sheets-Sheet 3

INVENTORS
HANS-GEORG ZIMMERMANN
ULRICH SCHALLER
BY

William V. Ebs

THEIR ATTORNEY

United States Patent Office 3,373,722
Patented Mar. 19, 1968

3,373,722
COOLING SYSTEM FOR THE ROTOR OF A ROTARY INTERNAL COMBUSTION ENGINE
Hans-Georg Zimmermann, Heilbronn, and Ulrich Schaller, Neckarsulm, Germany, assignors to NSU Motorenwerke Aktiengesellschaft, Neckarsulm, and Wankel G.m.b.H., Lindau (Bodensee), Germany
Filed Aug. 29, 1966, Ser. No. 575,584
Claims priority, application Germany, Sept. 17, 1965, N 27,355
4 Claims. (Cl. 123—8)

The present invention relates to means for cooling rotary mechanisms. More particularly, the invention is directed to a system for cooling the inner body or rotor of such mechanisms and constitutes an improvement upon the mechanisms of United States Patent No. 3,180,323 issued Apr. 27, 1965.

In one form of rotary mechanism according to the said patent, rotor cooling passage means extend between end faces of the rotor and communicate at one end face of the rotor with a working fluid intake passage in one of the two side walls of the engine housing, the working fluid being the fuel-air mixture in the case of a rotary internal combustion engine. A flow-over channel provided in the other side wall brings the rotor cooling passage means into communication with the working chambers of the engine as the device is operated. Another flow-over channel provided in the side wall containing the intake passage enables the working chambers to come into communication with the intake passage not only by way of the rotor passage means but also directly. The provision of such second flow-over channel results in better volumetric efficiency and therefore in better performance at high speed when the resistance to flow through the rotor is substantial. With a flow-over channel in each of the two side walls, however, the possibility exists at high speed when resistance to flow in the rotor passages is high, that by far the greater amount of working fluid will flow into the working chamber through the flow-over channel in the side wall containing the intake passage and that only a small quantity of working fluid insufficient to adequately cool the rotor will flow through the rotor passage means. Also, in engines utilizing the working fluid to lubricate rotor and shaft bearings, there may not be a sufficient quantity of fluid available for lubrication when required.

A prime object of the invention is to ensure sufficient cooling of the rotor and adequate lubrication of the rotor and shaft bearings in rotary mechanisms.

Other objects and advantages of the invention will become apparent hereinafter.

The described rotary mechanism of the patent is improved in accordance with the present invention by suitably timing the opening and closing of the flow-over channel in one side wall with respect to the flow-over channel in the other side wall. More particularly, the flow-over channels are arranged so that the flow-over channel in the side wall containing the intake passage opens only after the flow-over channel in the other side wall and all of the working fluid first inducted into a working chamber is caused to flow through the rotor, whereas during a later portion of the induction stroke, the working fluid may also flow directly into the working chamber through the flow-over channel in the side housing containing the intake passage. While flow through the rotor is relatively slight during the latter portion of the induction stroke of a working chamber, shortly after the completion of such induction stroke, the induction stroke of the next operative chamber begins and for a time all working fluid inducted into such chamber passes through the rotor. In this way, the rotor is kept cool and the bearings are properly lubricated while at the same time high volumetric efficiency is assured.

Referring to the drawings which show a preferred embodiment of the invention:

FIG. 1 is a vertical, longitudinal, sectional view of a rotary internal combustion engine embodying the features of the invention;

FIG. 2 is a cross-sectional view taken on the plane of the line 2—2 of FIG. 1;

FIG. 3 is a cross-sectional view taken on the plane of the line 3—3 of FIG. 1, and showing the rotor of the engine in a position where one flow-over channel has just opened;

FIG. 4 is a cross-sectional view taken on the plane of the line 4—4 of FIG. 1, and showing the rotor in a position where the other flow-over channel has just opened;

Figure 5:
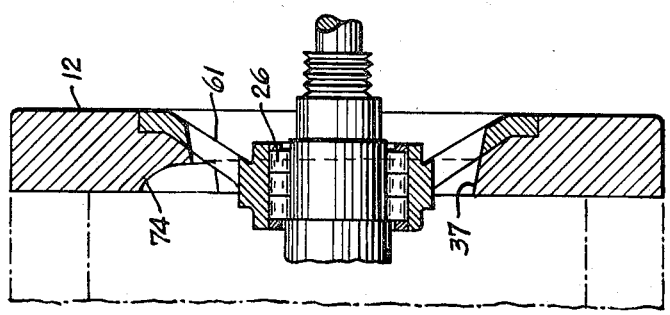
FIG. 5 is a sectional view taken on the plane of the line 5—5 of FIG. 3.
Figure 6:
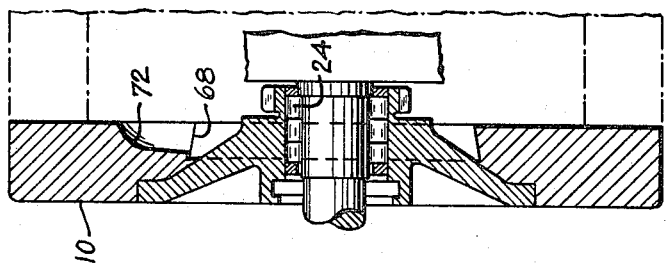
FIG. 6 is a sectional view taken on the plane of the line 6—6 of FIG. 4.

In the rotary combustion engine of the drawings, reference characters 10 and 12 designate axially spaced side walls of an engine housing and reference character 14 denotes a peripheral housing wall having an inner surface 16 which basically has the form of an epitrochoid and includes two arched lobe-defining portions. The side walls 10 and 12 are provided with bearing flanges 18 and 20 that rotatably support a shaft 22 on bearings 24 and 26. The shaft 22 includes an eccentric 28 which supports a rotor 30 for turning on bearings 32. The rotor 30, which is generally triangular in shape, includes radially movable seal strips 34 which maintain substantially continuous gas-sealing engagement with the inner surface 16 of peripheral wall 14 upon rotation of the rotor within the engine housing and define three variable-volume working chambers 36a, 36b and 36c in the engine.

An annular intake passage 37 for fuel and air is provided in side wall 12 of the engine, and an exhaust passage 38 for combustion gases is provided in peripheral wall 14. The engine may be provided with a sparkplug as at 42 for igniting a compressed combustible fuel-air mixture at the appropriate time such that the mixture is caused to expand and drive the rotor (counterclockwise as viewed in FIGS. 2 and 3). Alternatively, the engine may be operated as a diesel in which case the sparkplug is not required, since ignition of the fuel is initiated by the temperature reached through compressing of the fuel-air mixture. During engine operation, each of the working chambers has a cycle of operation including the four phases of intake, compression, expansion and exhaust.

As shown, an internally toothed ring gear 44 is attached to rotor 30. The ring gear 44 is in mesh with an externally toothed gear 46 which is rigidly attached to the housing side wall 10. The gearing 44 and 46 is not provided to drive or impart torque to shaft 22, but to index or register the position of the rotor 30 with respect to the engine housing during rotation of the rotor.

Shaft 22 carries two flywheels, flywheel 48 adjacent to side wall 10 and flywheel 50 adjacent to side wall 12. The flywheels 48 and 50 are suitably counterweighted to balance the rotor 30 and eccentric 28, such as with lightening holes 52 as shown in flywheel 48. Flywheel 50 is provided with vanes 54 that are canted in a direction to cause them to act as a pressure fan in a direction toward the rotor. An intake passage 56 is provided upstream from the flywheel 50 in housing cover 58. A carburetor (not shown) would normally be attached upstream from the intake pasage 56 unless fuel injection is to be used with the engine. The bearing flange 20 includes channels 60 between ribs 61 for conducting gas from the fan formed by the vanes 54 to the annular intake passage 37 in side wall 12, which passage is enclosed by rotor face seals 64. As shown, the rotor 30 is provided with hollow cavity 66 which communicates with the annular passage 37 in wall 12 and with a corresponding annular space 68 which is formed in side wall 10 and enclosed by rotor face seals 70. Side wall 10 includes a flow-over channel 72 which extends from annular space 68 outwardly toward the peripheral wall 14, and side wall 12 includes a flow-over channel 74 that extends from annular passage 37 outwardly toward wall 14. The outer boundary of rotor 30 controls the opening and closing of channels 72 and 74 and brings each working chamber during the induction phase of its operative cycle into communication with annular spaces 68 and 37 to provide for the admission to the chamber of a fresh fuel-air charge for combustion.

The channels 72 and 74 are arranged in the side walls 10 and 12, respectively, so that channel 72 is opened by rotor 30 before channel 74. As may be seen by comparing FIGS. 3 and 4, the flow-over channel 72 has just begun to open when the apex of the rotor has traversed the distance along the inner surface 16 of the peripheral wall from a dead-center position at $a$ to a location $b$, whereas the flow-over channel 74 opens only after the rotor has traversed a greater distance from the dead-center position with the rotor apex at $a$ on the inner surface 16 to a location at $c$. Because of the earlier opening of flow-over channel 72, all of the mixture first inducted into a working chamber flows through the rotor cavity 66 and is effective to cool the rotor. Such first inducted mixture enters the rotor cavity 66 by way of passage 56, vanes 54 and annular intake passage 37 of side wall 12. The rotor bearings 32 which connect with the rotor cavity by way of passages 75, and the shaft bearings 24 and 26 which connect with the rotor cavity through passages 76 and 78, respectively, are lubricated by oil deposited from the fuel-air mixture.

When the rotor has traveled sufficiently far to open channel 74, the greater part of the mixture enters the working chamber through channel 74, rather than through the rotor cavity 66 and channel 72, because of the lower resistance to flow through the channel 74. Less heat is imparted to the mixture flowing into the working chamber through channel 74 and it is not chopped up by the rotor. As a result, volumetric efficiency is substantially improved.

The flow-over channels 72 and 74 may be formed as in FIGS. 3 and 4 so that channel 74 closes somewhat sooner than channel 72 and all of the mixture brought into the engine at the end of the induction stroke is caused to flow through the rotor cavity 66, or the channels may be formed so that they close at the same time.

It will, of course, be understood that the invention is not limited to the specific arrangements shown and described, but includes within the scope of the accompanying claims any departures therefrom which do not sacrifice its chief advantages.

What is claimed is:

1. A rotary internal combustion engine comprising spaced-apart side walls and a peripheral wall interconnecting the side walls to form a hollow outer body, a rotatable shaft journaled in the side walls and having an eccentric portion disposed within said outer body, and a rotor disposed within the outer body and having a plurality of portions sweeping the inner surface of the peripheral wall in sealing relation therewith, the rotor being mounted on the eccentric for rotation relative to the outer body and to the eccentric, said rotor having an internal cavity for the flow of a working fluid through the rotor, the cavity being open toward each of the side walls, one side wall having a passage for supplying the working fluid therethrough to the rotor cavity, such passage being located in that portion of said one side wall which is at all rotor positions radially inward of the outer periphery of the rotor, said one side wall also including a flow-over passage for connecting the working fluid supply passage with working chambers of the engine formed between the rotor and inner surface of the outer body, the other side wall also including a flow-over passage for connecting the rotor cavity with said working chambers, the opening and closing of both flow-over passages being controlled by the outer contour of the rotor and said flow-over passages being so situated and formed that motion of the rotor during operation of the mechanism results in the flow-over passage in said other side wall being opened to each working chamber before the flow-over passage in the side wall containing the working fluid supply passage is opened to said chamber such that working fluid first enters each working chamber by way of the rotor cavity and flow-over passage in the said other side wall, and thereafter enters the chamber by way of the flow-over passage in the side wall containing the working fluid supply passage without flowing through the rotor cavity.

2. A rotary internal combustion engine as defined in claim 1 wherein the flow-over passages are so formed and situated that the rotor closes the flow-over passage in the side wall containing the working fluid supply passage before closing the other flow-over passage.

3. A rotary internal combustion engine as defined in claim 1 wherein the flow-over passages are so formed and situated that the rotor closes both flow-over passages at substantially the same time.

4. A rotary internal combustion engine as defined in claim 1 including bearings rotatably supporting the rotor on the eccentric and other bearings supporting the shaft for rotation in the outer body, and passages connecting the rotor cavity with the rotor bearings and shaft bearings whereby lubricant mixed with the working medium is carried in sufficient quantity to the rotor and shaft bearings while the flow-over passage in said other side wall is open and before the flow-over passage in the side wall containing the working fluid supply passage is open to assure that said rotor and shaft bearings are adequately lubricated.

References Cited

UNITED STATES PATENTS

| | | | |
|---|---|---|---|
| 990,742 | 4/1911 | Jacobs. | |
| 3,112,870 | 12/1963 | Bentele | 123—8 X |
| 3,180,323 | 4/1965 | Paschke | 123—8 |

RALPH D. BLAKESLEE, *Primary Examiner.*